LINE CIRCUIT REPEATER AND TRANSFER APPARATUS FOR COMMUNICATION SYSTEMS
Filed Nov. 27, 1946
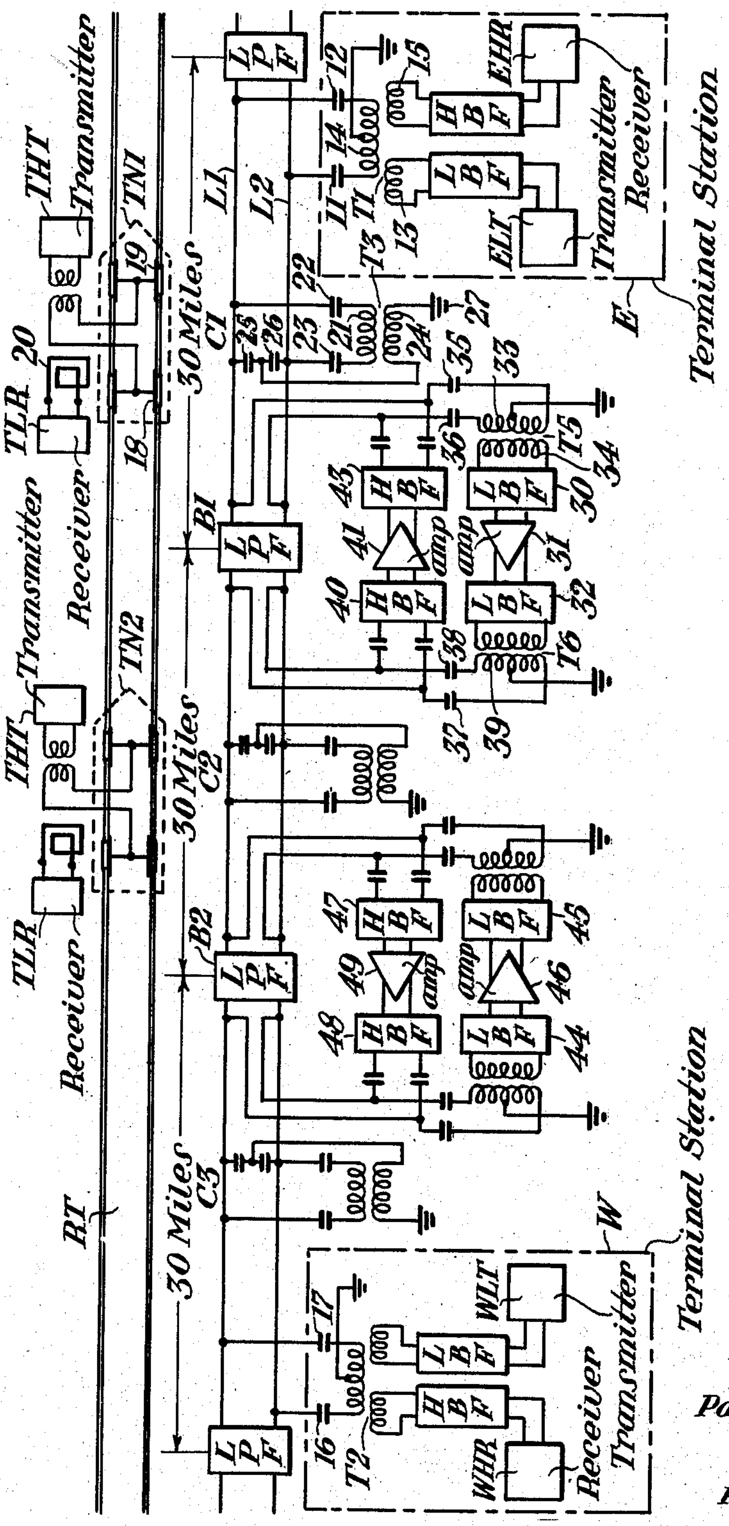
INVENTOR
Paul N. Bossart.
BY [signature]
HIS ATTORNEY Patented May 1, 1951

2,550,958

UNITED STATES PATENT OFFICE 2,550,958

LINE CIRCUIT REPEATER AND TRANSFER APPARATUS FOR COMMUNICATION SYSTEMS

Paul N. Bossart, Cheswick, Pa., assignor to The Union Switch & Signal Company, Swissvale, Pa., a corporation of Pennsylvania Application November 27, 1946, Serial No. 712,498

2 Claims. (Cl. 246—8)

My invention relates to line circuit repeater and transfer apparatus for communication systems, and more particularly to such apparatus for inductive carrier communication systems for vehicles operating over a given trackway.

One of the purposes of communication systems for vehicles operating over a given trackway is to provide communication between a terminal station and the vehicles en route. For example, in railway train communication systems, telephone communication between a dispatcher's office at a terminal and a train operating over a division which may include one to two hundred miles of track is generally provided. Under such circumstances, a relatively long range of transmission is necessary. In inductive carrier communication systems, the amount of power sent out from a transmitter may be limited by regulations and the range of transmission of the energy originally supplied may be insufficient to reach vehicles at the more remote portions of the trackway.

Again, in such communication systems, it may be necessary to provide a plurality of different two-way conversations which may be carried on simultaneously through a common transmitting channel.

Accordingly, a feature of my invention is the provision of improved line circuit repeater and transfer apparatus to extend the range of transmission in a communication system using a carrier current.

Another feature of my invention is the provision of improved repeater and transfer apparatus for communication systems and which apparatus permits a plurality of two-way conversations simultaneously.

A more specific feature of my invention is the provision of novel line circuit repeater and transfer apparatus for a railway train inductive carrier telephone system.

Other features, objects and advantages of my invention will appear as the specification progresses.

The foregoing features, objects and advantages of my invention I attain by the provision of repeater and transfer apparatus which uses both the longitudinal and transverse circuits of a pair of line wires.

A pair of line wires with their distributed capacitance and conductance to ground and the ground path form a so-called longitudinal circuit. The two line wires may also be used in series and in this arrangement they form a so-called transverse circuit.

These two line wires are preferably mounted parallel to and reasonably close to the trackway of the vehicle and their longitudinal circuit is inductively associated with vehicle carried circuit elements. That is, a transfer of communication energy between vehicles and a wayside transmitting channel is accomplished in part at least by an inductive relationship between vehicle carried circuit elements and the longitudinal circuit of a pair of line wires.

To permit a plurality of two-way conversations simultaneously, I propose to use carriers of a first or low frequency band for transmission from wayside stations to vehicles and carriers of a second or high frequency band for transmission from the vehicles to the wayside stations. That is, each two-way conversation would be accomplished by using a carrier selected from a first or low frequency band of carriers for transmission from a wayside station to a vehicle and a carrier selected from a second or high frequency band of carriers for transmission from the vehicle to the wayside station. By way of illustration, I shall assume that a low band of carriers comprises carrier frequencies $f1$, $f2$, $f3$ and $f4$ and a high band of carrier frequencies comprises the carriers $f5$, $f6$, $f7$ and $f8$. With such bands a maximum of four two-way conversations can be permitted. For example, one two-way conversation may be accomplished by using the carrier $f1$ for transmission from a terminal station to a train and the carrier $f5$ for transmission from the train to the station. It is to be understood that my invention is not limited to the above assumed low and high bands of carrier frequencies and these bands can be made to include a greater or less number of carriers.

The magnetic field set up from a transverse circuit is much below that set up from the longitudinal circuit and thus more power may be fed to the transverse circuit than to the longitudinal circuit without exceeding the so-called low power rule limiting the field to 15 microvolts per meter at a distance normal to the line circuit of one electrical radian. Thus, for extended transmission from a wayside station to vehicles operating over a trackway I connect the station apparatus to the transverse circuit of a pair of line wires and then at spaced points transfer the energy to the longitudinal circuit of the line wires for inductive transfer of the energy to vehicle carried elements. With carrier frequencies of the order here contemplated, the transverse line circuit attenuation may be of the order of 1 db. per mile. This means that repeaters should be spaced every 25 to 30 miles to satisfactorily extend the range of transmission from a wayside station. Blocking means in the form of filters or choke coils are placed in the line wires at each repeater location and the input and output of the repeater apparatus at this location are connected to the line wires on the opposite side of the blocking means to avoid any feed back. That is to say, at each selected location for repeater apparatus, the line wires are sectionalized by means of blocking filters or choke coils.

To permit two-way transmission each repeater equipment includes two circuit channels, one of which includes a directional filter and an amplifier disposed to pass only the carriers used for transmission from the wayside station to the vehicles and the other of which circuit channel includes a directional filter and an amplifier disposed to pass only the carriers used for transmission from vehicles to the wayside station.

I have found that when the line wires are sectionalized and repeater apparatus located about every 30 miles, the energy can be transferred from the transverse circuit to the longitudinal circuit at approximately the mid point of each such section of the line wires and provide effective transfer of energy to the vehicles for 15 miles each side of the transfer point without the magnitude of the energy transferred to the longitudinal circuit exceeding the value permitted by the low power rule mentioned hereinbefore. Each such transfer apparatus includes a transformer having a first winding connected to the transverse circuit and a second winding connected to the longitudinal circuit to transfer energy from the transverse circuit to the longitudinal circuit and vice versa. This transfer apparatus includes only passive elements involving no gain so that there is no feed back that might cause interference or what is commonly known as singing.

I shall describe one form of apparatus embodying my invention and shall then point out the novel features thereof in claims.

The accompanying drawing is a diagrammatic view showing one form of apparatus embodying my invention when used with an inductive carrier railway train telephone system. It is to be understood that my invention is not limited to railway train telephone systems and this one application serves to illustrate the many places the apparatus is useful.

Referring to the drawing, the reference character RT designates a division of railway track extending between two terminal stations E and W. Such a division may be of any convenient length, and I shall assume for illustration that it is of the order of 90 miles. The railway may be a single track line or the tracks RT may be one track of a multiple track road and to aid in understanding the invention, I shall assume the track RT is an eastbound track of a multiple track road and the two trains shown conventionally at TN1 and TN2 are eastbound trains.

The reference characters L1 and L2 designate a pair of line wires extending along the railway. These line wires could be a pair mounted on the usual pole line and they would extend substantially parallel to and reasonably close to the track RT. That is to say, the line wires L1 and L2 are within effective inductive range of the track. This pair of line wires may be wires used in an existing telephone or similar circuit and are used in the train telephone system as an additional service without interfering with their present use. The line wires L1 and L2 can be wires installed for the train telephone system alone.

The terminal stations E and W and each train TN1 and TN2 are provided with two-way telephone equipment each of which equipments includes a transmitter and at least one receiver, and which devices are shown conventionally for the sake of simplicity since the specific structure of each such device forms no part of my invention.

In order to permit a plurality of different two-way conversations, a first or low frequency band or group of carrier frequencies are used for transmission from the terminal stations to the trains and a second or high band or group of carrier frequencies are used for transmission from the trains to the terminal stations, and a given two-way conversation is accomplished by using a selected one of the frequencies of the low frequency band, such as carrier frequency $f1$, for station to train transmission and selecting a frequency of the high frequency band, such as carrier frequency $f5$, for transmission from the train to the station.

The telephone equipment at station E, for example, includes a transmitter ELT capable of sending a carrier telephone current of the selected carrier frequency $f1$ and a receiver EHR responsive to a carrier telephone current using the carrier frequency $f5$. Similarly, the terminal station W is provided with a transmitter WLT capable of sending a carrier telephone current of the carrier frequency $f1$ and a receiver WHR responsive to carrier telephone current of the carrier frequency $f5$. The telephone equipment of each train TN1 and TN2 includes a transmitter THT capable of sending a carrier telephone current of the high carrier frequency $f5$ and a receiver TLR responsive to a carrier telephone current of the low carrier frequency $f1$.

Such transmitters and receivers may be of any one of several arrangements and they may be, for example, similar to those disclosed in Letters Patent of the United States No. 2,064,639, granted December 15, 1936, to Leland D. Whitelock et al., for Communicating Systems, or to those described in my copending application for Letters Patent of the United States, Serial No. 575,311, filed January 30, 1945, for Railway Train Communication Systems, now Patent No. 2,484,680, granted October 11, 1949.

The transmitter ELT and receiver EHR at station E are connected across the transverse circuit of the line wires L1 and L2 through band pass filters LBF and HBF, a transformer T1 and blocking capacitors 11 and 12. To be specific, the output of transmitter ELT is supplied to a first winding 13 of transformer T1 through filter LBF, and a second winding 14 of transformer T1 is connected across the line wires L1 and L2 through capacitors 11 and 12. The receiver EHR is connected to a third winding 15 of the transformer T1 through filter HBF. The filter LBF at station E and all other filters designated LBF in the drawing are disposed to pass the low frequency band of carriers and to substantially suppress all frequencies outside of this band. Similarly, the filter HBF at the station E, as well as other HBF filters to be referred to hereinafter, are disposed to pass the high band of carrier frequencies and to substantially suppress all frequencies outside of that band. It follows, therefore, that the transmitter ELT when made active supplies a carrier telephone current of the carrier frequency $f1$ to the transverse line circuit and the receiver EHR when made active is responsive to a carrier telephone current of the carrier frequency $f5$ flowing in the transverse line circuit. At the terminal station W, the transmitter WLT and receiver WHR are connected to the transverse line circuit through band pass filters LBF and HBF, respectively, a transformer T2 and blocking capacitors 16 and 17, as will be readily understood by an inspection of the drawing. It should be pointed out that the blocking capacitors 11 and 12 at station E and the blocking capacitors 16 and 17 at station W are disposed to pass the carrier frequencies here used for train communication and to block direct current and low frequency alternating current that may be used for telegraph and similar services.

Referring to train TN1, for example, its transmitter THT and receiver TLR are connected to circuit elements which are electrically coupled to a trackway transmitting channel. This transmitting channel includes the track rails and paralleling line wires in multiple due to the distributed mutual inductance between the rails and line wires and due to the distributed impedance between the rails and the line wires and ground. Thus, the longitudinal circuit of the line wires L1 and L2 is a part of a trackway transmitting channel of the train telephone system. Such a transmitting channel is explained in my Letters Patent of the United States No. 2,064,642, granted December 15, 1936, for Railway Train Communication Systems and reference is made to this patent for a full understanding of such a transmitting channel for train communication.

The transmitter THT of train TN1 is connected to a sending circuit which includes two spaced pairs of wheels 18 and 19 of the train. Current supplied by transmitter THT flows in the rails between the two pairs of wheels 18 and 19 and the voltage drop created across this length of rails causes current to flow in the rails each side of the train and the distributed rail to ground impedance and energy from this rail and ground circuit is transferred to the longitudinal circuit of the line wires due to the distributed inductance between the line wires and the rails, and also due to the induction between the connection of the sending circuit on the train and the rails and the line wires. It follows that communication current supplied by the transmitter on the train flows in the longitudinal circuit of the line wires. The receiver TLR of train TN1 is connected to an air core coil 20 mounted on the train for inductive relationship with the track rails and the line wires and thus communication current flowing in the longitudinal circuit of the line wires is inductively transferred to the coil to create a corresponding electromotive force therein, and such electromotive force is in turn applied to the receiver TLR.

The train TN2 and all other trains would be equipped with train telephone apparatus similar to that just explained for the train TN1.

To assure satisfactory transmission of telephone current from stations E and W to trains at all points along the division, here assumed to be approximately 90 miles in length, two repeater locations B1 and B2 are provided. Locations B1 and B2 are preferably spaced about 30 miles from stations E and W, respectively, and are about 30 miles apart, as indicated in the drawing. This spacing assures that excessive attenuation of the current flowing in the transverse circuit will be avoided. As will appear hereinafter, communication is provided between station E and trains for 60 miles to the west of that station, and between station W and trains for 60 miles to the east of that station. This arrangement gives an overlap of 30 miles in which a train can communicate with both stations.

To sectionalize the line wires L1 and L2 for the communication system, a low pass filter LPF is interposed in the line circuit at locations B1 and B2, and also at the terminal stations E and W. Each of the low pass filters LPF is proportioned to block the flow of carrier current here used for communication in both the transverse and longitudinal circuits but to pass direct current and low frequency alternating current that may be used for telegraph or similar services.

Looking at location B1, for example, the repeater equipment includes two circuit channels. A first one of such circuit channels includes a low carrier band filter LBF, an amplifier 31 and a second filter 32 also of the LBF type. To be explicit, the transverse line circuit of the line wires L1 and L2 to the east of the line filter LPF at location B1 is connected to a primary winding 33 of a transformer T5, secondary winding 34 of which transformer is connected to the input side of filter 30. Two blocking capacitors 35 and 36 are preferably interposed in the line wire connection, the capacitors 35 and 36 being disposed to pass the carrier frequency but to block direct current and low frequency alternating current. The output of the filter 30 is connected to the input side of amplifier 31 of standard form and the output of the amplifier is connected to the input of filter 32, and the output of filter 32 is in turn connected through a transformer T6 and blocking capacitors 37 and 38 to the transverse circuit of the line wires to the west side of the associated low pass filter LPF. It is clear that this first circuit channel of the repeater apparatus at location B1 is effective to pass from the transverse circuit to the east of the location to the transverse circuit to the west of the location the communication current supplied by the transmitter ELT at station E. Also the first circuit channel is directional and passes energy only from the east to the west, the energy being amplified as seems necessary. For reasons to appear shortly, the mid point of winding 33 of transformer T5 and the mid point of winding 39 of transformer T6 are preferably connected to ground.

The second circuit channel of the repeater at location B1 comprises a filter 40 of the HBF type, an amplifier 41 and a second filter 43 of the HBF type. In this second circuit channel, the input of the filter 40 is connected to the transverse circuit to the west of the location and its output is connected to the input of the amplifier 41, while the output of the amplifier is connected through filter 43 to the transverse circuit to the east of location B1. Preferably blocking capacitors disposed to pass the carrier frequency but to block direct current and low frequency alternating current are interposed in this second circuit channel as will be readily understood by an inspection of the drawing. It follows that this second circuit channel of the repeater apparatus at location B1 is effective to pass from the transverse circuit to the west of location B1 to the transverse circuit to the east of the location, communication current of the carrier frequency f5, the energy being amplified as necessary.

The repeater equipment at location B2 is the same as that at location B1 except the first circuit channel is made directional to pass communication current of the low frequency band from the transverse circuit west of location B2 to the transverse circuit east of that location, and the second circuit channel is made directional to pass current of the high frequency band from the transverse circuit east of location B2 to the transverse circuit west of that location.

Transfer apparatus is provided at locations or points C1, C2 and C3, which are located one at substantially the mid point of each of the three sections of the line wires. The transfer apparatuses at these three points are similar and looking at point C1, the apparatus includes a transformer T3 which has a first winding 21 connected across the transverse circuit of the line wires L1 and L2 through blocking capacitors 22 and 23, and a second winding 24 connected to the longitudinal circuit of the line wires, two capacitors 25 and 26 in series being connected across the line wires and winding 24 being connected between the junction terminal of the capacitors 25 and 26 and a ground electrode 27. The blocking capacitors 22 and 23 are disposed to pass the carrier frequency currents used but to block direct current and low frequency alternating current. It follows that the carrier telephone current flowing in the transverse circuit of the line wires L1 and L2 at the point C1 will flow in winding 21 and a corresponding electromotive force will be induced in winding 24 and this electromotive force would cause the telephone current to be supplied to the longitudinal circuit. Conversely, carrier telephone current flowing in the longitudinal circuit at point C1 will flow in part to ground through winding 24 and induce a corresponding electromotive force in winding 21, and this electromotive force would cause the telephone current to flow in the transverse circuit.

Each of the transfer points C2 and C3 is provided with transfer apparatus similar to that just described for point C1 and its description need not be repeated.

As explained hereinbefore, the parts of the transfer apparatus are proportioned to supply to the longitudinal circuit current of sufficient magnitude to assure effective transfer to trains for a distance 15 miles each side of the point.

In describing the operation of the apparatus, I shall first assume that an operator at the terminal station E desires to talk with the train TN1 which is operating over the track adjacent the first section of the line wires. The operator switches the transmitter ELT to an active condition to supply communication current to the transverse line circuit. A portion of this current flows in winding 21 of transformer T3 at transfer point C1 and communication current is transferred to the longitudinal circuit and becomes available for influencing the receiver TLR of the train TN1. The train crew can answer the operator by setting the transmitter THT on the train in an active condition and supply communication current to the trackway transmitting channel which includes the longitudinal line circuit. A portion of this current flowing in the longitudinal line circuit will flow to ground through winding 24 of the transformer T3 and the current is transferred to the transverse circuit. The current is then transmitted to the station E and is passed by the filter HBF to the station receiver EHR. If the operator at station E desires to talk with the train TN2, which is operating in the second 30 mile stretch to the west of station E, the procedure is similar. The operator at station E switches the transmitter ELT to an active condition and communication current is supplied to the transverse line circuit. This current is transmitted to the repeater location B1 attenuated by the 30 miles of the line circuit. At location B1 the current is amplified and passed by the first circuit channel of the repeater apparatus to the transverse circuit west of location B1. A portion of the repeated current will be transferred to the longitudinal circuit through the transfer apparatus at point C2 and the current transferred to the longitudinal circuit becomes available to influence the receiver TLR of the train TN2. In answering, the communication current supplied by the transmitter of the train TN2 is inductively transferred to the adjacent longitudinal circuit. The current is then transferred by the apparatus at point C2 to the transverse circuit and appears at repeater location B1 where it is amplified and passed by the second circuit channel of the repeater apparatus to the transverse circuit east of location B1. The current then appears at station E and is passed by the filter HBF to the station receiver.

It is to be pointed out that the current transmitted from station E is not passed west of the repeater location B2 because the first circuit channel of the repeater apparatus at location B2 is directional to pass current only from the west to the east. Thus, the operator at station E is limited to communication with trains for the first 60 miles west of station E.

The operator at terminal station W can communicate with trains for 60 miles east of that station. With the transmitter WLT at station W made active communication current of the low frequency carrier $f1$ is supplied to the transverse line circuit and a portion is transferred to the longitudinal circuit at the transfer point C3 and the current becomes available for transmission to any train operating in the stretch of track adjacent the first section of the line circuit east of station W. A train in this stretch can answer the operator at station W, the current supplied by the train transmitter being applied first to the longitudinal circuit, transferred at point C3 to the transverse circuit and passed therefrom through the filter HBF to the station receiver WHR. The current sent out from the station W will appear at repeater location B2 where it is amplified and passed by the first frequency channel of the repeater equipment, and which channel includes filters 44 and 45 and amplifier 46, to the transverse circuit east of location B2. A portion of the repeated current is transferred at point C2 to the longitudinal circuit and becomes available for influencing the receiver TLR of train TN2 or any other train operating in the stretch of track adjacent the second section of the line circuit east of station W. Current sent out by the transmitter of a train in this stretch of track is transferred from the longitudinal circuit to the transverse circuit at the point C2 and a portion of the current is transmitted to location B2 where it is amplified and passed by the second circuit channel including filters 47 and 48 and amplifier 49 to the transverse circuit west of location B2 and is then transmitted to station W. The current transmitted from station W will not appear east of location B1 because of the directional feature of the first circuit channel of the repeater apparatus at location B1.

It is apparent that for divisions longer than 90 miles additional repeater locations and transfer points can be provided, the stations and number of repeater locations and transfer points being made to suit the particular division. In any event the repeater equipment apparatus can be made directional so that there will be an overlap of the order of 30 miles or more in which a train can communicate with either or both terminal stations.

It is to be pointed out that the ground connection of winding 33 of transformer T5 serves as an aid for the longitudinal circuit of the section between location B1 and station E but such ground connection may not be needed.

Apparatus such as here disclosed has the advantages that all repeaters operate between transverse circuits and are prevented by blocking filters from feeding the output back to the input so that there will be no singing and other noise influences. The necessary transfer from a longitudinal circuit to a transverse circuit and vice versa is accomplished by passive elements involving no gain so that there is no danger of singing at these points. Furthermore, the current can be transmitted from a wayside station over a relatively long distance with the magnitude of the current applied to any longitudinal circuit not exceeding that permitted by the so-called low power rule.

Although I have herein shown and described but one form of line circuit repeater and transfer apparatus for communication systems embodying my invention, it is understood that various changes and modifications may be made therein within the scope of the appended claims without departing from the spirit and scope of my invention.

Having thus described my invention, what I claim is:

1. In a vehicle communication system, the combination comprising, a stretch of trackway, a vehicle to operate on the trackway, two wayside stations one at each end of said stretch, communication equipments one at each said station and on said vehicle, each said equipment including a transmitter and a receiver, each said station transmitter having means for supplying communication current of a first carrier frequency, each said station receiver having means responsive to communication current of a second carrier frequency, said vehicle transmitter having means for supplying current of said second carrier frequency and said vehicle receiver having means responsive to current of said first carrier frequency, a pair of line wires extending the full length of said stretch and adaptable of being used in both a transverse and a longitudinal line circuit, vehicle carried circuit elements having connections to said vehicle transmitter and receiver and disposed for inductive relationship with the longitudinal line circuit, means at each said station to couple the transmitter and receiver of the same station to the transverse line circuit at a point adjacent the station, means to sectionalize said line wires into three sections each independent of the other with respect to said communication current, repeater apparatus at the two junctions of said sections, each repeater apparatus having a first and a second circuit channel and each of which channels includes a filter and an amplifier, the first channel being tuned to pass said first carrier frequency and not said second carrier frequency and the second channel being tuned to pass the second carrier and not the first carrier, each said repeater apparatus connected to the transverse line circuit of the adjacent sections with its first channel disposed to pass current only from the adjacent end section to the center section of the three sections and its second channel disposed to pass current only from the center section to the adjacent end section, transfer apparatus at an intermediate point of each of said three sections, and each said transfer apparatus including a transformer having a first winding connected to the transverse line circuit of the same section and a second winding connected to the longitudinal line circuit of the same section.

2. In a system for communication between trains operating over a given railway division and two terminal stations one at each end of the division, the combination comprising, a railway track division, two terminal stations one at each end of the division, a train, telephone equipments one at each said station and on said train, each said equipment having a transmitter and a receiver with the station transmitters including means for supplying a first carrier and the train transmitter including means for supplying a second carrier and with the station receivers including means responsive to said second carrier and the train receiver including means responsive to said first carrier, a pair of line wires extending along said division and which wires are adaptable for use in both a transverse and a longitudinal line circuit, circuit means at each said station to connect the telephone equipment of the same station to the transverse circuit of said line wires, circuit means on said train connected to said train equipment and inductively coupled to the longitudinal circuit of said line wires, filter means interposed in the line wires at select points to sectionalize the line wires into at least three sections with respect to the telephone current, a repeater at each junction of said sections, each said repeater having connections to the transverse circuit of the adjacent sections and including a first and a second circuit channel, each said channel including a filter and an amplifier and each said first channel being tuned to pass only said first carrier and each said second channel being tuned to pass only said second carrier, a selected number of said repeaters counting from each of said terminals stations having their first channels made directional to pass current only away from the respective station and their second channels made directional to pass current only toward the respective station whereby a selected number of sections counting from each station can communicate only with the respective station and a selected intermediate section can communicate with both stations, transfer means located at a selected point of each said section, and each transfer means including a transformer having a first winding connected to the transverse circuit of the line wires of the same section and a second winding connected to the longitudinal circuit of the line wires of the same section.

PAUL N. BOSSART.

REFERENCES CITED

The following references are of record in the file of this patent:

UNITED STATES PATENTS

| Number | Name | Date |
|---|---|---|
| 1,453,387 | Espenschied et al. | May 1, 1923 |
| 1,803,453 | Affel | May 5, 1931 |
| 1,803,454 | Affel | May 5, 1931 |

FOREIGN PATENTS

| Number | Country | Date |
|---|---|---|
| 157,556 | Great Britain | June 2, 1920 |